US006405571B2

(12) United States Patent
Tyas

(10) Patent No.: US 6,405,571 B2
(45) Date of Patent: *Jun. 18, 2002

(54) CABLE DRIVE ASSEMBLY FOR MOTOR VEHICLE

(75) Inventor: Barry Tyas, Oxford (GB)

(73) Assignee: MG Rover Group Limited, Birmingham (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,755

(22) Filed: Oct. 13, 1999

(30) Foreign Application Priority Data

Nov. 25, 1998 (GB) ............................................ 9825760

(51) Int. Cl.[7] ............................................... B60R 25/00

(52) U.S. Cl. .......................... 70/237; 474/53; 74/89.22

(58) Field of Search ...................... 70/237, 238; 474/7, 474/42, 53, 116, 220; 74/89.2, 89.22

(56) References Cited

U.S. PATENT DOCUMENTS 4,030,373 A * 6/1977 Leonard .................. 74/230.19
4,342,559 A * 8/1982 Williams .................. 474/53 X
4,530,676 A * 7/1985 Leonard ................... 474/53 X
4,559,027 A * 12/1985 Sattel ......................... 474/116
4,714,452 A * 12/1987 Kumm et al. ............. 474/53 X
4,907,465 A * 3/1990 Machida et al. ....... 74/89.22 X
5,235,866 A * 8/1993 Truman et al. ............ 74/89.22
5,535,607 A * 7/1996 Dzurko et al. ................ 70/237
5,555,769 A * 9/1996 Lichtenberg ............... 74/89.22
5,590,917 A 1/1997 Brooks et al. ................ 292/21
5,603,539 A * 2/1997 Gruhn et al. ............. 70/237 X
5,642,636 A * 7/1997 Mitsui ......................... 70/237
5,666,834 A * 9/1997 Inoue .......................... 70/237
5,730,027 A * 3/1998 Hormann ................... 74/89.22
5,752,811 A * 5/1998 Petro ..................... 74/89.22 X
5,813,282 A * 9/1998 Azuma ...................... 74/89.22
5,852,943 A * 12/1998 Dutka et al. .................. 70/237
6,045,272 A * 4/2000 Ryan et al. ............ 74/89.22 X
6,165,087 A * 12/2000 Iammatteo ..................... 474/7

FOREIGN PATENT DOCUMENTS

DE 2553335 * 8/1976 ................ 74/89.22
EP 59658 * 9/1982 .................. 70/237
EP 303304 * 2/1989 .................. 70/237
EP 304357 * 2/1989 .................. 70/237
EP 0 375 275 A2 6/1990
FR 2 757 558 6/1998
GB 787611 * 12/1957 ................ 74/89.22
JP 149656 * 9/1982 ................ 74/89.22

* cited by examiner

*Primary Examiner*—Suzanne Dino Barrett
(74) *Attorney, Agent, or Firm*—Davis & Bujold, P.L.L.C.

(57) ABSTRACT

A cable drive assembly 102 for a motor vehicle locking system is described. A lock mechanism 104 is mounted on a first carrier 108. The first carrier is connected to a second carrier 110 by a cable, such that turning of an appropriate key in the lock causes the first carrier to rotate. In turn this causes the second carrier to rotate. Rotation of the second carrier causes a latch mechanism remote from the locking system to be actuated. The first carrier is held in a first position within a housing prior to insertion of the lock mechanism. Insertion of the lock mechanism during assembly of the locking system frees the carrier and allows it to rotate in response to turning of the lock mechanism.

10 Claims, 4 Drawing Sheets

CABLE DRIVE ASSEMBLY FOR MOTOR VEHICLE

BACKGROUND OF THE INVENTION

The present invention relates to a locking system for a motor vehicle, and in particular to a cable drive assembly for a motor vehicle locking system. The cable drive assembly allows a motor vehicle door lock to be located at a position remote from a motor vehicle door latch mechanism.

Known locking systems for motor vehicles can be complex to manufacture and difficult to assemble. In particular, there is a difficulty in maintaining a lock mechanism in a desired correct relationship with an associated housing and drive mechanism during assembly. There is scope for failure of the locking system in all of these areas. It is an advantage of the present invention that it provides for ease of assembly and manufacture. It also allows for the motor vehicle door lock to be positioned at a location remote from the motor vehicle door latch mechanism.

SUMMARY OF THE INVENTION

According to a first aspect of the present invention, a cable drive assembly for a motor vehicle locking system comprises a housing, a first carrier means mounted within the housing, a second carrier means mounted within the housing, and cable means connecting the first and second carrier means.

Preferably the first carrier means is held in a first position within the housing prior to insertion of a lock mechanism and is mounted in a second position for rotation within the housing when the lock mechanism has been inserted. More preferably, the housing and the first carrier means are provided with complementary locating features to hold the first carrier means in the first position.

Preferably, the second carrier means is mounted for rotation within the housing.

Preferably, the cable means comprises a cable connected at a first end to the first carrier means, at an intermediate point to the second carrier means and at a second end to the first carrier means.

Preferably, the housing is provided with a flange to prevent interference with the cable means.

Preferably, the housing is provided with a cover to prevent interference with the cable means.

According to a second aspect of the present invention, a locking mechanism for a motor vehicle comprises a lock mechanism, a cable drive assembly according to the first aspect of the invention, drive means and a latch mechanism.

BRIEF DESCRIPTION OF THE DRAWINGS

The invention will now be described, by way of example only, with reference to the accompanying drawings, in which:

Referring to FIGS. 1 to 10 of the drawings, a cable drive assembly 2 for a motor vehicle locking system is shown.

DETAILED DESCRIPTION OF THE PREFERRED EMBODIMENTS

Figure 1:
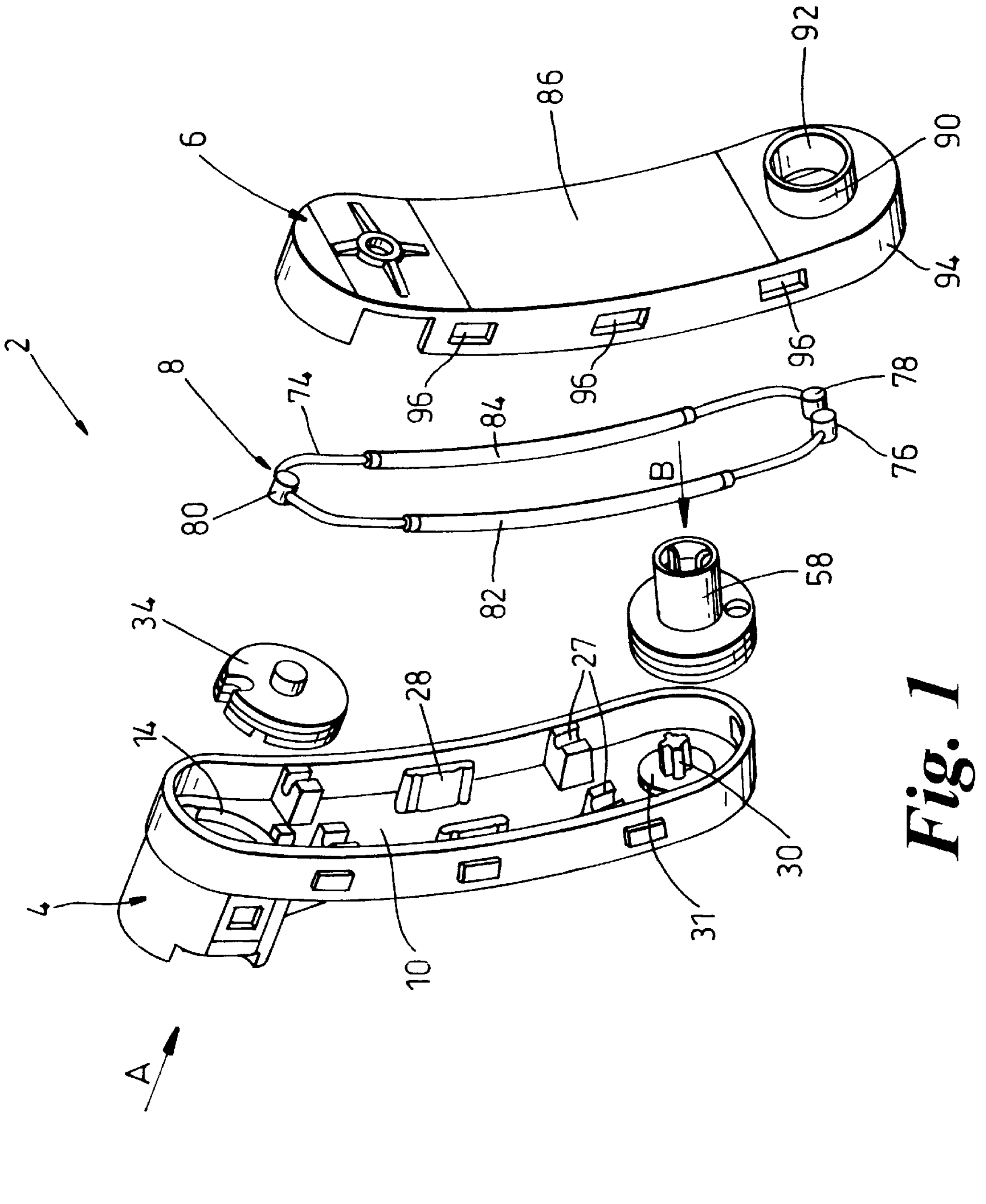
FIG. 1 shows an exploded perspective view of a part of a cable drive assembly in accordance with the present invention.
Figure 2:
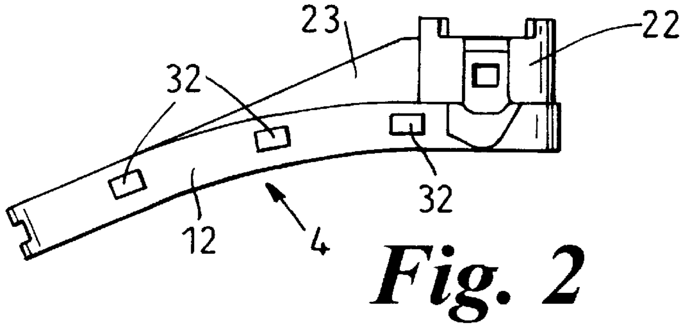
FIG. 2 shows a side view of a cable drive base housing included in the part shown in FIG. 1.
Figure 3:
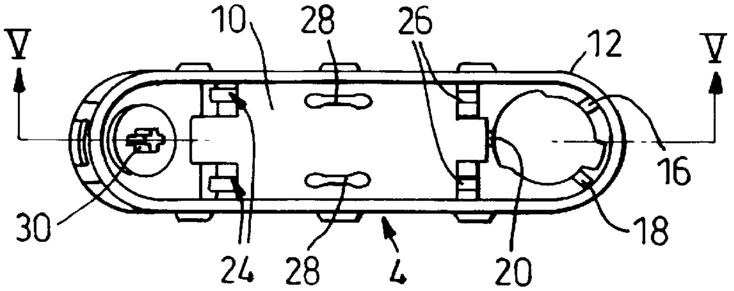
FIG. 3 shows a plan view of the cable drive base housing shown in FIG. 2.
Figure 4:
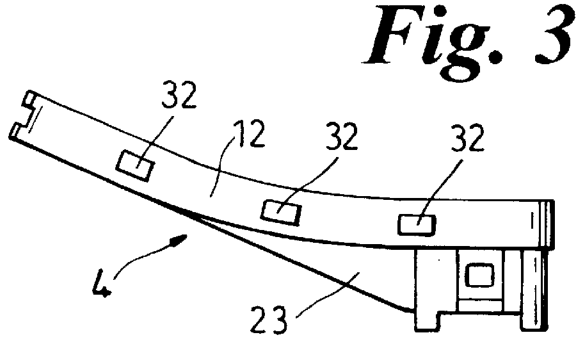
FIG. 4 shows an opposite side view of the cable drive base housing shown in FIG. 2.
Figure 5:
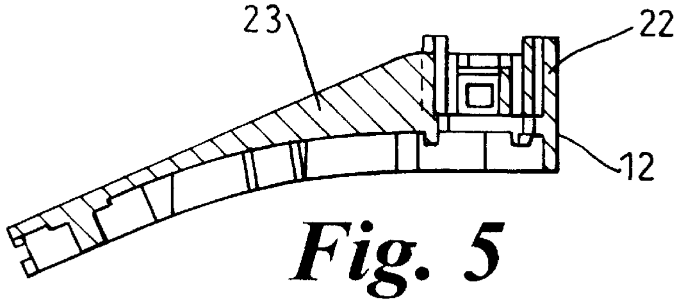
FIG. 5 shows a sectional view along line V—V of FIG. 3.
Figure 6:
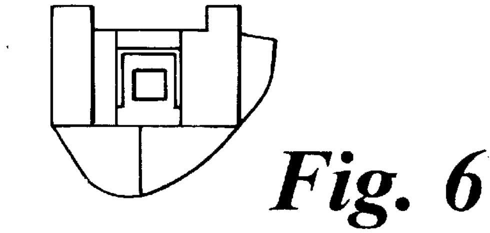
FIG. 6 shows an end view of the cable drive base housing shown in FIG. 2.
Figure 7:
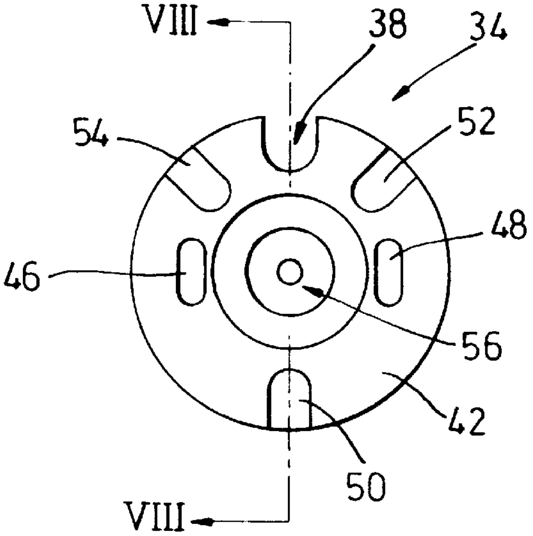
FIG. 7 shows a plan view of a drive pulley included in the cable drive base housing shown in FIG. 1.
Figure 8:
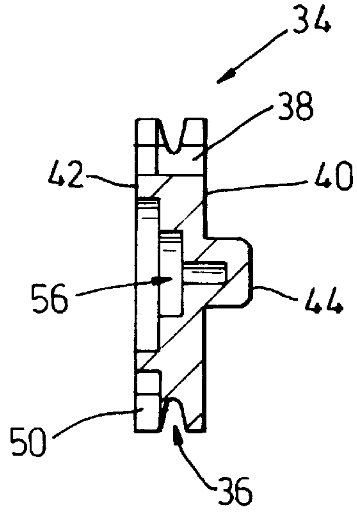
FIG. 8 shows a sectional view along line VIII—VIII of the drive pulley shown in FIG. 7.
Figure 9:
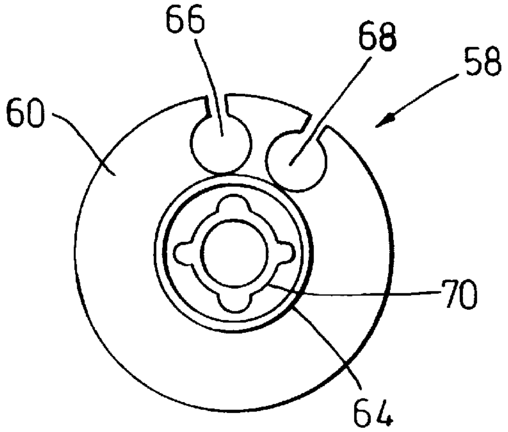
FIG. 9 shows a plan view from above of driven pulley included in the cable drive base housing shown in FIG. 1.
Figure 10:
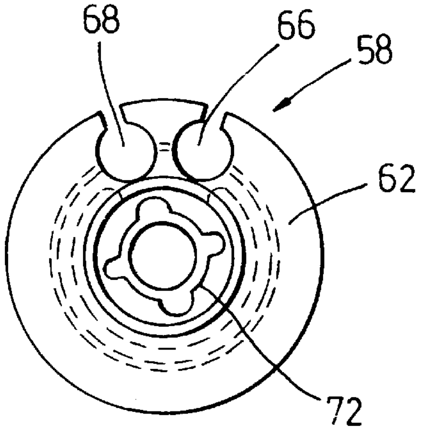
FIG. 10 shows a plan view from below of the driven pulley shown in FIG. 9.

The cable drive assembly includes a housing. The housing comprises a base 4 and a cover 6. The cable drive assembly further comprises a first carrier means mounted within the housing, a second carrier means mounted within the housing, and a cable means in the form of a cable assembly 8 connecting the first and second carrier means.

The cable drive base 4 comprises a substantially elongate member 10 having rounded portions at first and second ends thereof, and a first wall 12 extending in a first direction normally thereto around the periphery of the elongate member. A substantially circular opening 14, is provided at the first end of the elongate member. Three dogs 16,18,20 are provided disposed about a periphery of the opening 14 extending in the first direction. A second wall 22 around the opening extends in a second direction away from the first end of the elongate member. A flange member 23 extends from the elongate member to the circular wall to increase the structural strength of the base. The elongate member is further provided with two pairs of guide means 24,26 and a pair of guide rails 28 within a region of the elongate member bounded by the first wall. Each of the guide means comprise a pair of oppositely disposed resilient members 27 defining a gap therebetween. Each guide rail 28 takes the from of an upstanding member. A rotatable axle 30 is mounted at the second end of the elongate member, again within the region bounded by the first wall. The rotatable axle is conveniently "X" shaped in plan view and includes a circular flange 31 at a lower end thereof. An outer surface of the first wall is provided with a plurality of protrusions 32 extending flexibly away from an outer surface of the first wall.

The first carrier means conveniently comprises a drive pulley 34. The drive pulley is substantially circular and is provided with a "V" shaped groove 36 running around a periphery of the pulley and a single recess 38 is formed at the periphery of the drive pulley extending through a thickness of the pulley. The drive pulley further comprises an upper surface 40 and a lower surface 42. The upper surface is provided with a boss 44. The lower surface is provided with a pair of shaped recesses 46,48 to receive in use engagement means of a locking mechanism, three recesses 50,52,54 disposed about the periphery of the lower surface and a central recess 56 shaped to receive a portion of the locking mechanism which in use will function as an axis of rotation for the drive pulley 34. The three recesses are conveniently equally spaced about the periphery of the lower surface and are adapted to engage with the dogs 16,18,20 provided about the circular opening in the base housing. The central recess is conveniently stepped in section and circular in plan view.

The second carrier means conveniently comprises a driven pulley 58. The driven pulley is substantially circular and is provided with a "V" shaped groove running around a periphery of the pulley. A pair of recesses 66,68 are formed at a periphery of the driven pulley and extend therethrough. The driven pulley further comprises an upper surface 60 and a lower surface 62. The upper surface is provided with an upstanding circular wall 64. Within the upstanding wall are located engagement means 70. In use, the engagement means engage complementary features of a drive means. The lower surface is provided with a shaped recess 72 to engage the rotatable axle provided at the second end of the elongate member. The driven pulley fits over and is supported by the rotatable axle.

The cable assembly 8 comprises a length of cable 74 having first and second ends. At the first and second ends of the cable there are provided respective first and second barrel shaped engagement features 76,78. The engagement features are secured to the respective end of the cable by any suitable means. A further barrel shaped engagement feature 80 is secured to an intermediate portion of the cable. A first sheath 82 is provided on the cable between the first end of the cable and the intermediate portion of the cable. A second sheath 84 is provided on the cable between the second end of the cable and the intermediate portion of the cable. The cable 74 may run freely within each of the first and second sheaths.

The cable drive cover 6 comprises an elongate member 86. A first end of the elongate member is provided with a sunken dimple 88. In use, a reverse side of the sunken dimple 88 is adapted to receive the boss 44 of the drive pulley. A second end of the elongate member is provided with an upstanding wall disposed about a generally circular opening 92 extending in a first direction from the elongate member. The elongate member further comprises an upstanding wall 94 extending in a second direction about a periphery of the elongate member. The wall is provided with a plurality of cut out portions 96.

The cable drive assembly is used to form part of a locking system for a motor vehicle. The cable drive assembly may conveniently be assembled prior to use in the locking system. The further barrel shaped engagement feature 80 is located within the recess 38 in the drive pulley and each of the first and second barrel shaped engagement features 76,78 are located within a respective recess 66,68 provided in the driven pulley. The driven pulley is placed in position over the rotatable axis 30. The driven pulley 34 is placed over the circular opening such that the recesses 50,52,54 provided on the lower side of the drive pulley engage with the dogs 16,18,20 provided about the opening. The ends of the sheaths 82,84 are pressed into the guide means on either side of the base housing such that the sheaths pass between the upstanding wall of the base housing and the guide rail 28 on each side of the housing. The cable drive cover 6 can then be placed over the cable drive base housing 4 and pressed home such that the plurality of protrusions 32 provided on the base engage in the plurality of openings 96 provided in the cover.

In this way the drive pulley is held in a first position within the housing prior to insertion of a lock mechanism. The lock mechanism is provided with protrusions that engage the shaped recesses 46,48 in the lower side of the drive pulley. Further insertion of the lock mechanism pushes the drive pulley off the dogs and thereby frees the carrier to allow the drive pulley to rotate. It can be seen that the housing and associated parts can be mounted into position in a door assembly, prior to insertion of the lock mechanism. Once the housing is in position, the lock mechanism can only be received in the housing in the correct position, i.e. when the protrusions on the lock mechanism engage with the shaped recesses 46,48 provided on the first carrier means. Thus there is no difficulty in maintaining the lock mechanism and the housing in the correct relationship during assembly as has been the case in the past.

Figure 11:
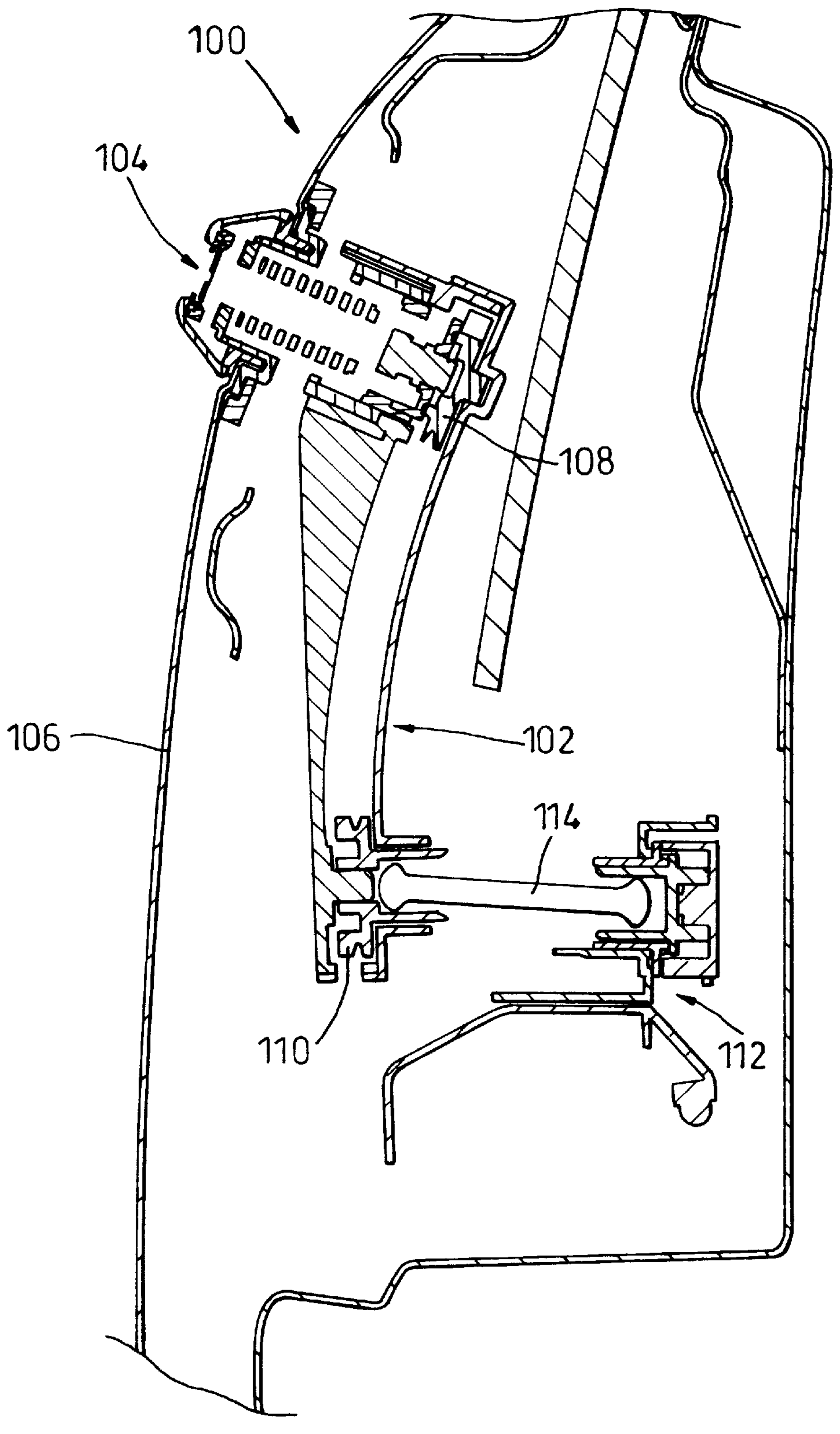
FIG. 11 shows in section a door assembly incorporating a cable drive assembly according to the present invention.

Referring to FIG. 11, there is shown a motor vehicle door assembly 100 incorporating a cable drive assembly 102 according to the present invention. A lock mechanism 104 is shown retained in position in an outer panel 106 of the door assembly. The lock mechanism has pushed the drive pulley 108 from the dogs such that in response to turning of the lock, upon insertion and rotation of an appropriate key, the drive pulley is rotated by protrusions provided at one end of the lock mechanism engaging with shaped recesses provided on the lower side of the drive pulley. The cable assembly (not shown) transfers rotation of the drive pulley 108 to the driven pulley 110. A latch mechanism 112 is provided to secure the motor vehicle door assembly in a closed position in a motor vehicle. The driven pulley 110 is connected to the latch mechanism 112 by drive means. In the illustrated embodiment, the drive means is in the form of a paddle 114.

I claim:

1. A motor vehicle locking system comprising:

a housing;

a first pulley mounted for rotation about a first axis in the housing;

a second pulley mounted for rotation about a second axis in the housing;

the first and second pulleys being drivingly connected by a cable, the cable being secured at first and second ends to one of the first and second pulleys and at an intermediate point to the other of the first and second pulleys;

means being provided to connect the first pulley drivingly to a lock mechanism; and means being provided for connecting the second pulley drivingly to a latch mechanism; and one of said pulleys being moved axially from a first position to a second position upon connection to one of said lock mechanism or said latch mechanism, means being provided to prevent rotation of the said one pulley when in its first position.

2. The motor vehicle locking system according to claim 1, wherein the housing and the first pulley are provided with complementary locating features to hold the first pulley in the first position.

3. The motor vehicle locking system as set forth in claim 1 wherein the housing is provided with a flange to prevent interference with the cable.

4. The motor vehicle locking system according to claim 1, wherein the housing is provided with one of a flange and a cover to prevent interference with the cable.

5. A motor vehicle locking system comprising:

a cable drive assembly having a housing;

a first pulley mounted about a first axis in the housing;

a second pulley mounted about a second axis in the housing;

the first and second pulleys being drivingly connected by a cable, the cable being secured at first and second ends to one of the first and second pulleys and at an intermediate point to the other of the first and second pulleys;

a lock mechanism drivingly connectable with the first pulley;

a latch mechanism drivingly connectable to the second pulley; and wherein one of said first and second pulleys of the cable drive assembly is axially movable along the respective first and second axis between a first non-rotatable position and a second rotatable position upon connection with the respective lock and latch mechanism.

6. The motor vehicle locking system according to claim 5, wherein the housing and the first pulley are provided with cooperating positioning means to hold the first pulley in the first non-rotatable position.

7. The motor vehicle locking system as set forth in claim 5 wherein the housing is provided with a flange to prevent interference with the cable.

8. The motor vehicle locking system according to claim 5, wherein the housing is provided with one of a flange and a cover to prevent interference with the cable.

9. The motor vehicle locking system according to claim 5 wherein the first pulley of the cable drive assembly is coupled to the lock mechanism and the second pulley of the cable drive assembly is coupled to a latch mechanism for driving the latch mechanism in response to operation of the locking mechanism.

10. A motor vehicle locking system comprising:

a cable drive assembly having a housing;

a first pulley mounted about a first axis in the housing;

a second pulley mounted about a second axis in the housing;

the first and second pulleys being drivingly connected by a cable, the cable being secured at first and second ends to one of the first and second pulleys and at an intermediate point to the other of the first and second pulleys;

a lock mechanism drivingly connectable with the first pulley;

a latch mechanism drivingly connectable to the second pulley;

one of said first and second pulleys of the cable drive assembly is axially movable along the respective first and second axis between a first non-rotatable position and a second rotatable position upon connection with the respective lock and latch mechanism;

the housing and the first pulley are provided with cooperating positioning means to hold the first pulley in the first non-rotatable position;

the housing is provided with a flange to prevent interference with the cable; and wherein the housing is provided with one of a flange and a cover to prevent interference with the cable.

* * * * *